United States Patent
Krishnakumar (10) Patent No.: US 9,998,903 B2
(45) Date of Patent: Jun. 12, 2018

(54) DETECTING BLUETOOTH LOW ENERGY (BLE) BEACONS USING WIFI

(71) Applicant: Avaya Inc., Santa Clara, CA (US)

(72) Inventor: Anjur S. Krishnakumar, Princeton, NJ (US)

(73) Assignee: Avaya Inc., Santa Clara, CA (US)

( * ) Notice: Subject to any disclaimer, the term of this patent is extended or adjusted under 35 U.S.C. 154(b) by 107 days.

(21) Appl. No.: 15/090,344

(22) Filed: Apr. 4, 2016

(65) Prior Publication Data
US 2017/0289785 A1  Oct. 5, 2017

(51) Int. Cl.
*H04W 8/00* (2009.01)
*H04W 4/00* (2018.01)
*H04W 84/12* (2009.01)

(52) U.S. Cl.
CPC .......... *H04W 8/005* (2013.01); *H04W 4/008* (2013.01); *H04W 84/12* (2013.01)

(58) Field of Classification Search
CPC ....... H04W 8/00; H04W 8/005; H04W 4/008; H04W 84/12
See application file for complete search history.

(56) References Cited

U.S. PATENT DOCUMENTS

| | | | |
|---|---|---|---|
| 9,445,220 B2* | 9/2016 | Granbery | H04W 4/008 |
| 9,551,775 B2* | 1/2017 | Rangarajan | G01S 1/08 |
| 9,560,060 B2* | 1/2017 | Baxley | H04L 63/1416 |
| 2010/0118834 A1* | 5/2010 | Kalhan | H04W 48/08 370/336 |
| 2010/0303047 A1* | 12/2010 | Ibrahim | H04W 4/001 370/338 |
| 2012/0040639 A1* | 2/2012 | Brisebois | H04W 48/02 455/408 |

(Continued)

FOREIGN PATENT DOCUMENTS

WO   WO 2011019976 A1 * 2/2011 ............ H04W 36/04

OTHER PUBLICATIONS

Rayanchu, et al., "Airshark: Detecting Non-WiFi RF Devices using Commodity WiFi Hardware," University of Wisconsin, retrieved from http://pages.cs.wisc.edu/~suman/pubs/airshark.pdf, 14 pages.

(Continued)

*Primary Examiner* — Tri H Phan
(74) *Attorney, Agent, or Firm* — Sheridan Ross P.C.

(57) ABSTRACT

Communication information is received from a Wireless Fidelity ("WiFi") interface. The WiFi interface may receive WiFi information from a WiFi endpoint and/or BLE beacons from a Bluetooth device. The reason a WiFi device can receive BLE beacons is because WiFi channels and BLE beacon frequencies overlap. The BLE beacon may come from a various types of Bluetooth devices, such as a sensor, a mobile device, a communication device, and/or the like. The communication information is filtered based on one or more defined BLE beacon channels. If there are one or more BLE beacons detected in the one or more defined BLE beacon channels, BLE information is generated. The BLE information is then sent to a communication device that tracks the BLE information. For example a network monitoring station can track the BLE information.

20 Claims, 5 Drawing Sheets

(56) References Cited

U.S. PATENT DOCUMENTS

| | | | |
|---|---|---|---|
| 2015/0350820 A1* | 12/2015 | Son ..................... | H04W 4/008 |
| | | | 455/41.2 |
| 2015/0351008 A1* | 12/2015 | Mayor ................. | H04W 48/16 |
| | | | 455/41.2 |
| 2016/0057613 A1* | 2/2016 | Hines ..................... | H04W 8/22 |
| | | | 455/419 |
| 2016/0094598 A1* | 3/2016 | Gedikian ............. | H04W 4/021 |
| | | | 455/456.3 |
| 2016/0174021 A1* | 6/2016 | Lim ..................... | H04W 4/008 |
| | | | 370/310 |
| 2016/0260301 A1* | 9/2016 | Miller ................ | G08B 13/2417 |
| 2017/0064745 A1* | 3/2017 | Kephart, Jr. .......... | H04W 76/02 |
| 2018/0035363 A1* | 2/2018 | Gupta .................. | H04W 48/16 |

OTHER PUBLICATIONS

Weng, "Classification of Wireless Interference on 2.4GHz Spectrum," Mitsubishi Electric Research Labs, 2014, retrieved from http://www.merl.com/publications/docs/TR2014-018.pdf, 8 pages.

* cited by examiner

DETECTING BLUETOOTH LOW ENERGY (BLE) BEACONS USING WIFI

BACKGROUND

In today's environment, Wireless Fidelity ("WiFi") access has become pervasive in the home and in business. Bluetooth has also become a technology that has become common place. Although WiFi and Bluetooth use some of the same radio frequencies, the two protocols are completely different protocols and require different hardware and software to work properly. WiFi is usually limited to ranges of under 100 meters while Bluetooth is usually limited to ranges under 10 meters. Because WiFi and Bluetooth require different hardware/software, use different protocols, and have different ranges, the two protocols exist separately.

SUMMARY

These and other needs are addressed by the various embodiments and configurations of the present disclosure. Communication information is received from a Wireless Fidelity ("WiFi") interface. The WiFi interface may receive WiFi information from a WiFi endpoint and/or Bluetooth Low Energy (BLE) beacons from a Bluetooth device. The reason a WiFi device can receive BLE beacons is because WiFi channels and BLE beacon frequencies overlap. The BLE beacon may come from a various types of Bluetooth devices, such as a sensor, a mobile device, a communication device, and/or the like. The communication information is filtered based on one or more defined BLE beacon channels. If there are one or more BLE beacons detected in the one or more defined BLE beacon channels, BLE information is generated. The BLE information is then sent to a communication device that tracks the BLE information. For example a network monitoring station can track the BLE information.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
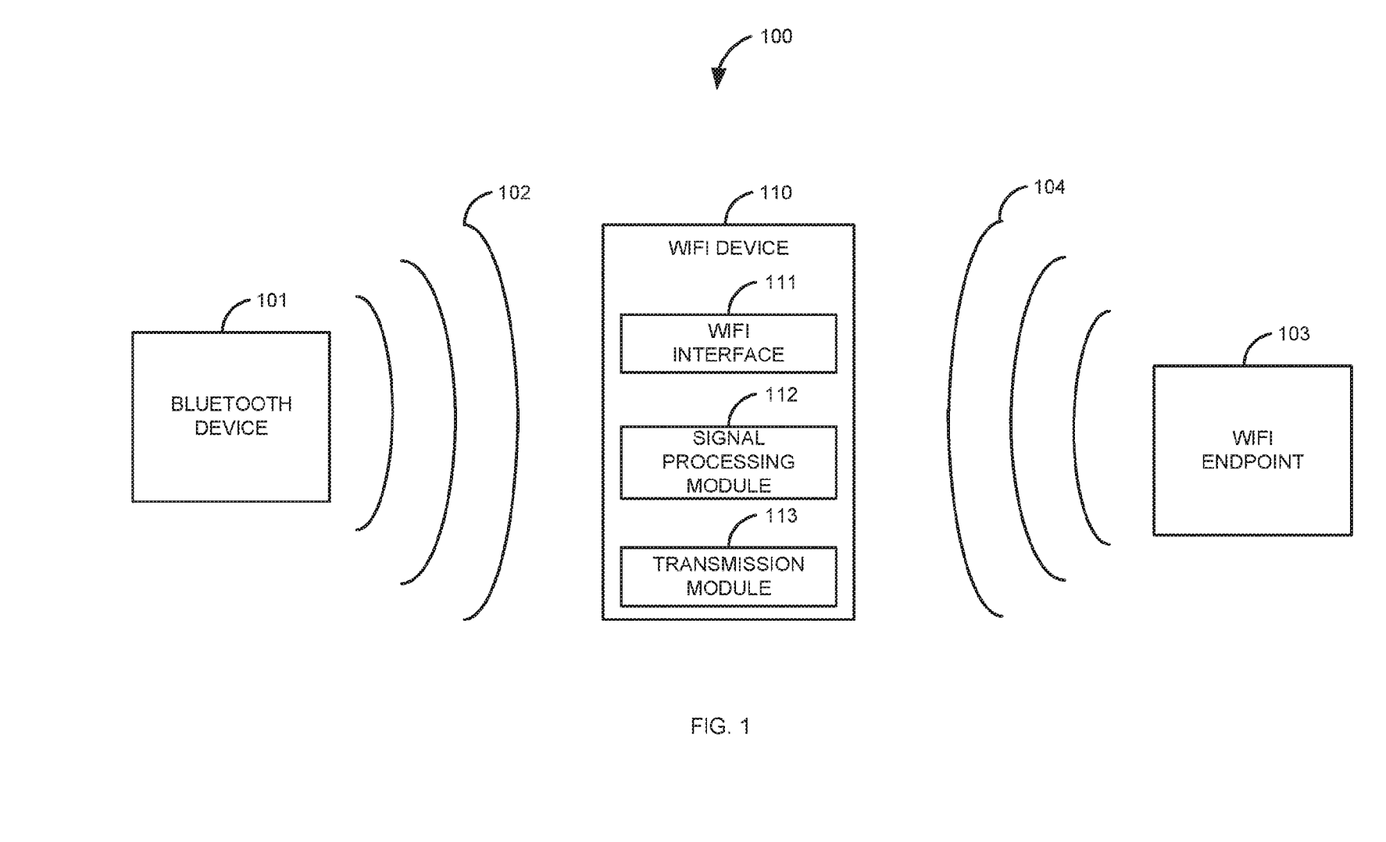
FIG. 1 is a block diagram of a first illustrative system for detecting Bluetooth Low Energy (BLE) beacons using WiFi.

FIG. 1 is a block diagram of a first illustrative system 100 for detecting BLE beacons 102 using WiFi. The first illustrative system 100 comprises a Bluetooth device 101, a WiFi endpoint 103, and a WiFi device 110.

The Bluetooth device 101 can be or may include any Bluetooth device 101 that can send Bluetooth transmissions, such communication device, a sensor, a computer, a cellular telephone, a smart phone, an appliance, a motor vehicle, and/or the like. The Bluetooth device 101 sends Bluetooth Low Energy (BLE) beacons 102.

The WiFi endpoint 103 can be or may include any device that can access a WiFi network, such as a Personal Computer (PC), a laptop device, a cellular telephone, a smart phone, a wireless printer, a tablet device, a notebook device, and/or the like. The WiFi endpoint 103 communicates with the WiFi device 110 via WiFi signals 104.

The WiFi device 110 can be or may include any WiFi device 110 that can provide wireless access, such as a WiFi hotspot, a wireless access point, a WiFi router, a WiFi hub, a WiFi extender, and/or the like. The WiFi device 110 is typically not designed to support Bluetooth or any Bluetooth protocols. For example, the WiFi device 110 may have a hardware WiFi interface 111 that is only designed to support WiFi communications. The WiFi interface 111 may be able to detect BLE beacons 102 because the WiFi beacon frequencies overlap the WiFi channels; however, the WiFi interface 111 will not have the capability to decode information received from BLE beacons due to lack of hardware/software support.

The WiFi device 110 further comprises the WiFi interface 111, a signal processing module 112, and a transmission module 113. The WiFi interface 111 is a hardware interface that can send and receive information according to WiFi 802.11 standard. For example, the WiFi interface 111 may comprise a Qualcomm Atheros AR9280 chip or another WiFi interface chip that is used to send and receive WiFi signals 104.

The processing module 112 is a software/hardware module that processes communication information from the WiFi interface 111. The signal processing module 112 may comprises software and a microprocessor, such as a Digital Signal Processor (DSP) or an application specific processor.

The transmission module 113 is a hardware/software module that can send BLE information to another device, such as computer. The BLE information may identify the presence of BLE beacons 102 and/or the lack of BLE beacons 102. The transmission module 113 may comprise a hardware network interface, such as an Ethernet interface, a wired interface, a wireless interface, and/or the like.

Figure 2:
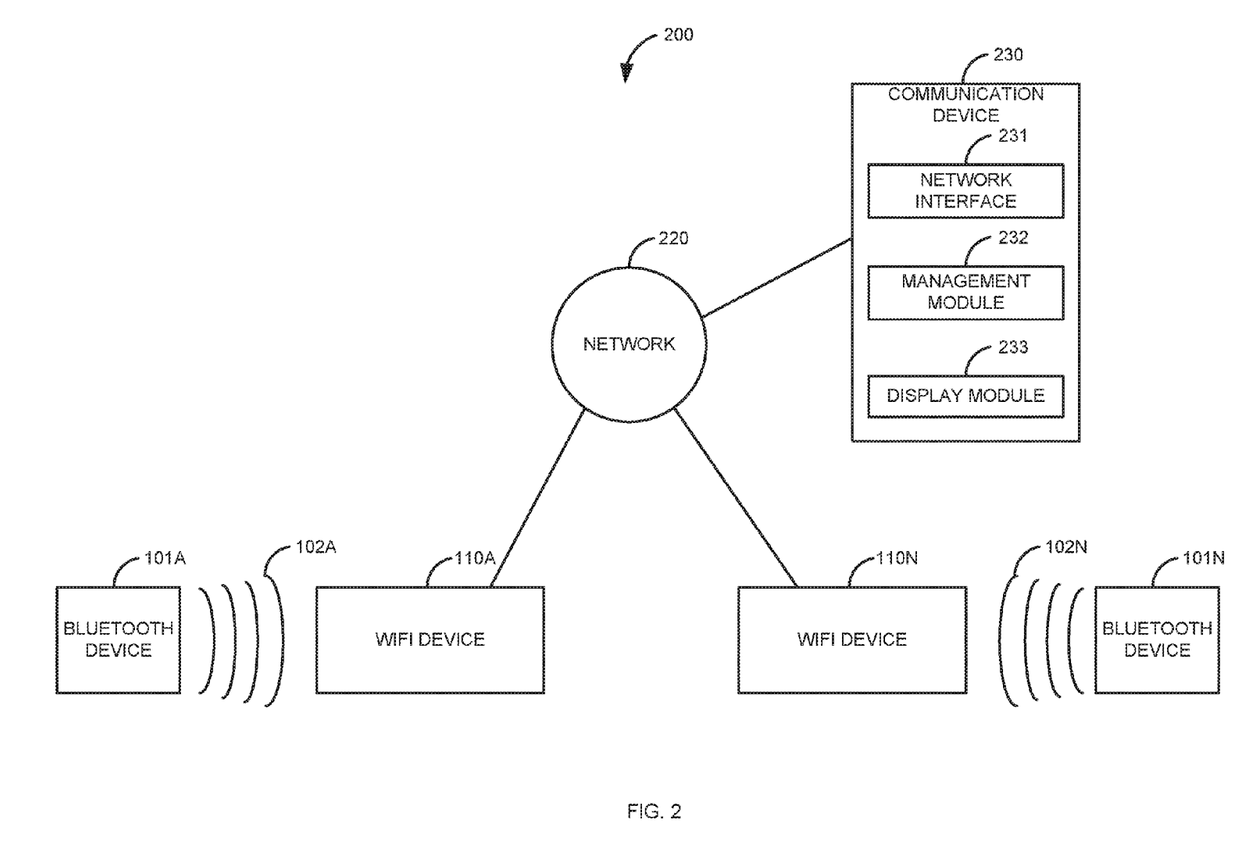
FIG. 2 is a block diagram of a second illustrative system for detecting BLE beacons from multiple WiFi devices.

FIG. 2 is a block diagram of a second illustrative system 200 for detecting BLE beacons 102 from multiple WiFi devices 110A-110N. The second illustrative system 200 comprises Bluetooth devices 101A-101N, WiFi devices 110A-110N, a network 220 and a communication device 230.

In FIG. 2, the WiFi device 110A receives one or more BLE beacons 102A from the Bluetooth device 101A. The WiFi device 110N receives one or more BLE beacons 102N from the Bluetooth device 101N. This allows the WiFi devices 101A-101N to send collected BLE information to the communication device 230 via the network 220.

The network 220 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 220 can use a variety of electronic protocols, such as Ethernet, Internet Protocol (IP), Session Initiation Protocol (SIP), Integrated Services Digital Network (ISDN), and the like. Thus, the network 220 is an electronic communication network configured to carry messages via packets and/or circuit switched communications.

The communication device 230 can be or may include any device that can be used to provide tracking information for Bluetooth devices 101, such as a Personal Computer (PC), a cellular telephone, a computer workstation, a server, a Personal Digital Assistant (PDA), a tablet device, a notebook device, a smart phone, and the like. The communication device 230 further comprises a network interface 231, a management module 232, and a display module 233.

The network interface 231 can be or may include any hardware interface that allows the communication device 230 to communicate on the network 220, such as an Ethernet interface, a WiFi interface 111, a cellular interface, a fiber interface, a wired interface, and/or the like. The management module 232 can be any hardware/software that can manage information received from the network interface 231, such as a management application. The display module 233 can be any hardware/software that can provide information for display, such as a video card, and/or the like. The display module 233 may also comprise a physical display that displays information to a user or administrator, such as a computer monitor.

Although not shown, FIG. 2 may also comprise one or more WiFi endpoints 103 that may send/receive WiFi signals 104 to the WiFi devices 110A-110N.

Figure 3:
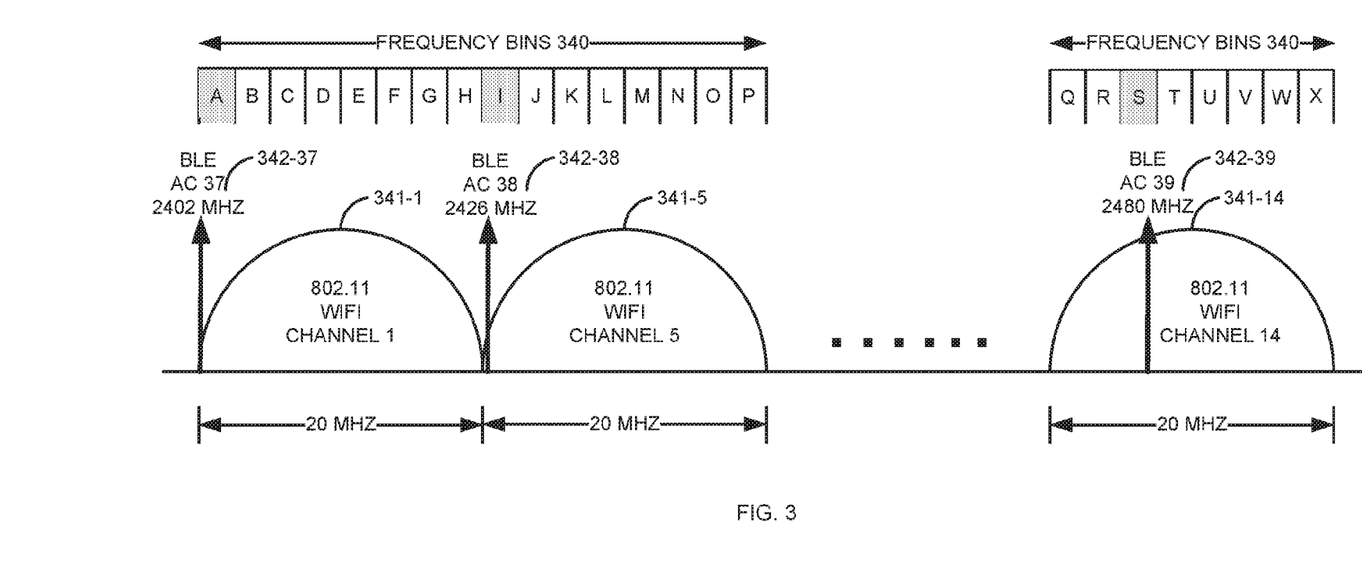
FIG. 3 is a diagram of a frequency spectrum that shows the overlapping frequency ranges of WiFi channels and BLE beacon channels.

FIG. 3 is a diagram of a frequency spectrum that shows the overlapping frequency ranges of WiFi (802.11) channels 341 and BLE beacon channels 342. The 802.11 standard comprises 14 WiFi channels 341, each with a frequency range of 20 Megahertz (MHz). Table 1 is a list of the different frequency ranges of each of the WiFi channels 341 (1-14) and the associated frequency ranges of each WiFi channel 341.

TABLE 1

WiFi Channel Frequency Ranges

| WiFi channel Number | Lower Frequency (MHz) | Center Frequency (MHz) | Upper Frequency (MHz) |
| --- | --- | --- | --- |
| 341-1 | 2401 | 2412 | 2423 |
| 341-2 | 2040 | 2417 | 2428 |
| 341-3 | 2411 | 2422 | 2433 |
| 341-4 | 2416 | 2427 | 2438 |
| 341-5 | 2421 | 2432 | 2443 |
| 341-6 | 2426 | 2437 | 2448 |
| 341-7 | 2431 | 2442 | 2453 |
| 341-8 | 2436 | 2447 | 2458 |
| 341-9 | 2441 | 2452 | 2463 |
| 341-10 | 2446 | 2457 | 2468 |

TABLE 1-continued

WiFi Channel Frequency Ranges

| WiFi channel Number | Lower Frequency (MHz) | Center Frequency (MHz) | Upper Frequency (MHz) |
|---|---|---|---|
| 341-11 | 2451 | 2462 | 2473 |
| 341-12 | 2456 | 2467 | 2478 |
| 341-13 | 2461 | 2472 | 2483 |
| 341-14 | 2473 | 2484 | 2495 |

FIG. 3 shows three WiFi channels 341: WiFi channel 1 (341-1), WiFi channel 5 (341-5), and WiFi channel 14 (341-14). WiFi channels 341-1 and 341-5 are located next to each other frequency wise because the WiFi channel centers are 5 MHz apart while each channel is 20 MHz wide (i.e., the WiFi channels 341 overlap).

The BLE beacon channels 342, also known as Bluetooth Advertising Channels, are part of the defined Bluetooth standard. The Bluetooth device 101 sends out the BLE beacons 102 using the BLE beacon channels 342. Table 1 shows the defined BLE beacon channel center frequencies, which each have a 1 MHz frequency range (500 KHz on each side of the center frequency). Table 1 also shows the corresponding overlapping WiFi channel for each BLE beacon channel 342.

TABLE 2

BLE Beacon Channels 342

| BLE Beacon Channel | Center Frequency (MHz) | Overlapping WiFi channel |
|---|---|---|
| 342-37 | 2402 | 341-1 |
| 342-38 | 2426 | 341-5 |
| 342-39 | 2480 | 341-14 |

The BLE beacon channel 342-37 is located at the bottom end of the frequency range of the WiFi channel 341-1. The BLE beacon channel 342-38 is located at the bottom end of the frequency range for the WiFi channel 341-5. The frequency ranges of the BLE beacon frequencies 342-37 and 342-38 are located where the WiFi channels 341-1 and 314-5 will likely have less signal strength. The BLE beacon channel 342-39 is located in WiFi channel 341-14. WiFi channel 341-14 is not typically used for WiFi or may have limited use in WiFi. Thus, all the BLE beacon channels 342 are in the spectrum of WiFi that has little or lower signal strengths.

The BLE beacons 102 are typically sent out at a defined interval. For example, the interval between BLE beacons 102 may be from 20 milliseconds to 10.24 seconds in steps of 0.625 milliseconds.

The defined interval may also be sent using different BLE beacon channels 342. For example, the BLE beacons 102 are typically sent in the sequence of the BLE beacon channel 342-37, the BLE beacon channel 342-38, and then in the BLE beacon channel 342-39. This process is then repeated based on the same interval. In some embodiments, the Bluetooth device 101 may only send a BLE beacon 102 in a specific BLE beacon channel 342, such as in BLE beacon channel 342-37.

The WiFi interface 111 typically comprises a computer chip that may be capable of dividing a specific WiFi channel 341 (a 20 MHz channel) into a plurality of frequency bins 340. For example, FIG. 3 shows that the WiFi channel 341-1 is divided into eight frequency bins (340A-340H). WiFi channel 341-5 is also divided into eight frequency bins (340I-340P). WiFi channel 341-14 is also divided into 8 frequency bins (340Q-340X).

In FIG. 3, the BLE beacon channel 342-37 falls into the frequency bin 340A (indicated by the highlight of the frequency bin 340A). The BLE beacon channel 342-38 falls into the frequency bin 340I (indicated by the highlight of frequency bin 340I). The BLE beacon channel 342-39 falls within the frequency bin 340S (indicated by the highlight of frequency bin 340S).

In this embodiment, the WiFi interface 111/signal processing module 112 can monitor a frequency bin 340 that is associated with a respective BLE frequency range 342. For example, the WiFi interface 111/signal processing module 112 can filter out communication information coming in on the frequency bins 340B-340H that are not associated with the BLE beacon channel 342-37 to only get BLE beacon information that is in the frequency bin 340A. This process is then repeated for the WiFi channel 341-5/BLE beacon channel 342-38 and WiFi channel 341-14/BLE beacon channel 342-39.

In this embodiment, the WiFi interface 111/signal processing module 112 may monitor one, two, or three of the BLE beacon channels 342 at one time or in a sequence. For example, the WiFi interface 111/signal processing module 112 may be set to only monitor the frequency bin 340I to look for a BLE beacon 102 in the BLE beacon channel 342-38. Alternatively, the WiFi interface 111/signal processing module 112 may monitor the frequency bins 340A, 340I and 340S at the same time or in sequence.

In another embodiment, the WiFi interface 111 may be able to divide two or more WiFi channels 341 into a series of frequency bins. For example, the WiFi interface 111 may be able to divide based two WiFi channels 341 into frequency bins 340 based on a 40 MHz frequency range. In this non-limiting example, the WiFi interface 111 can divide both WiFi channels 341-1 and 341-5 into sixteen frequency bins 340A-340P. The WiFi interface 111/signal processing module 112 can then filter out communication information coming from frequency bins 340B-340H and 340J-340P to determine if there is a BLE beacon 102 present in either of the BLE beacon channels 342-37 and 342-38 (frequency bins 340A and 340I).

In the above embodiments, the WiFi interface 111/signal processing module 112 may be set to monitor the respective defined BLE beacon channel 342 in the respective frequency bin 340 based on a dwell period. The dwell period may be defined to be long enough to cover one or more BLE beacon intervals. The dwell period may be based on a known BLE beacon interval of one or more Bluetooth devices 101, based on the minimum BLE beacon interval (20 milliseconds), based on the BLE step value of 0.625 millisecond, and/or the like.

Figure 4:
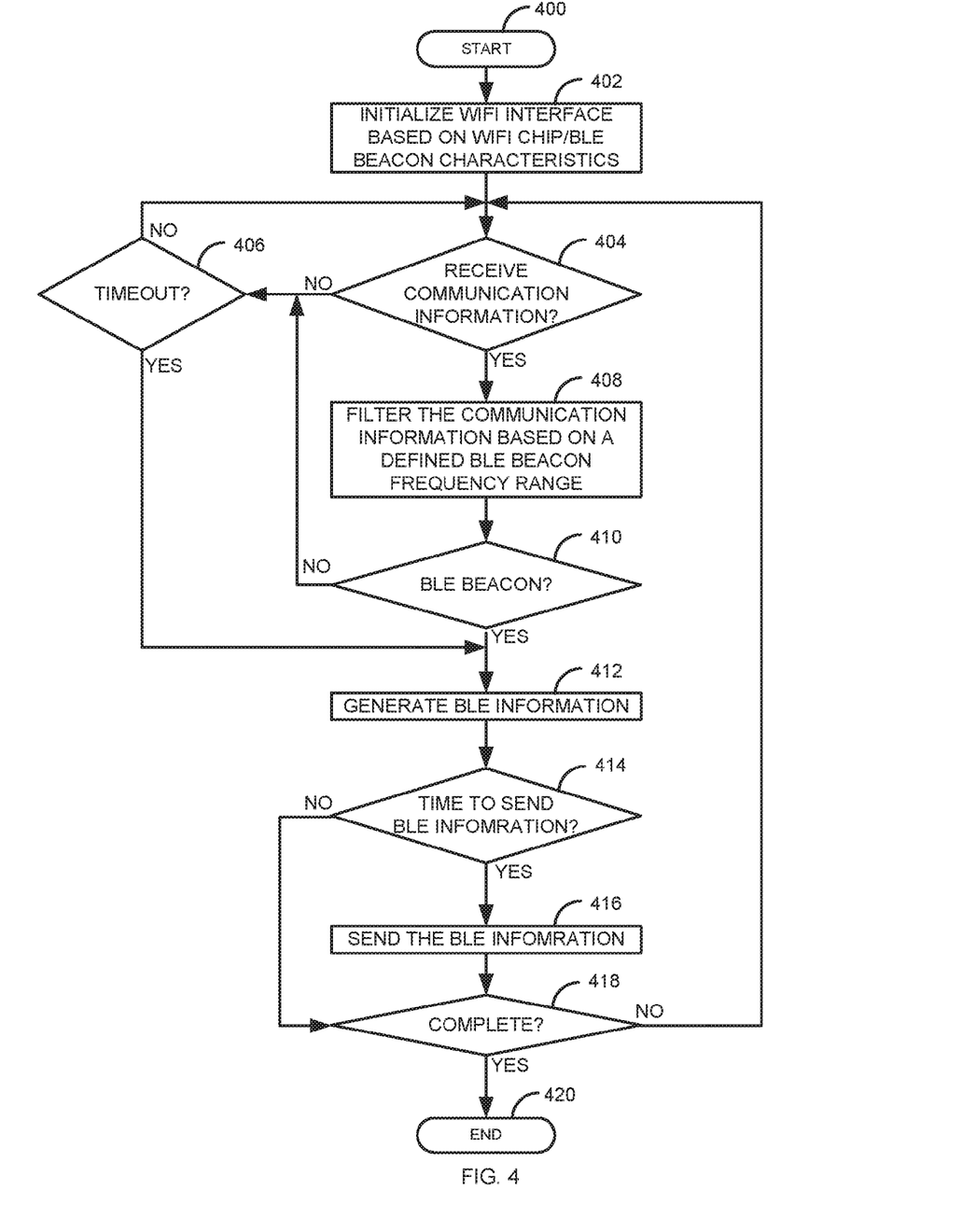
FIG. 4 is a flow diagram of a process for detecting BLE beacons using WiFi.
Figure 5:
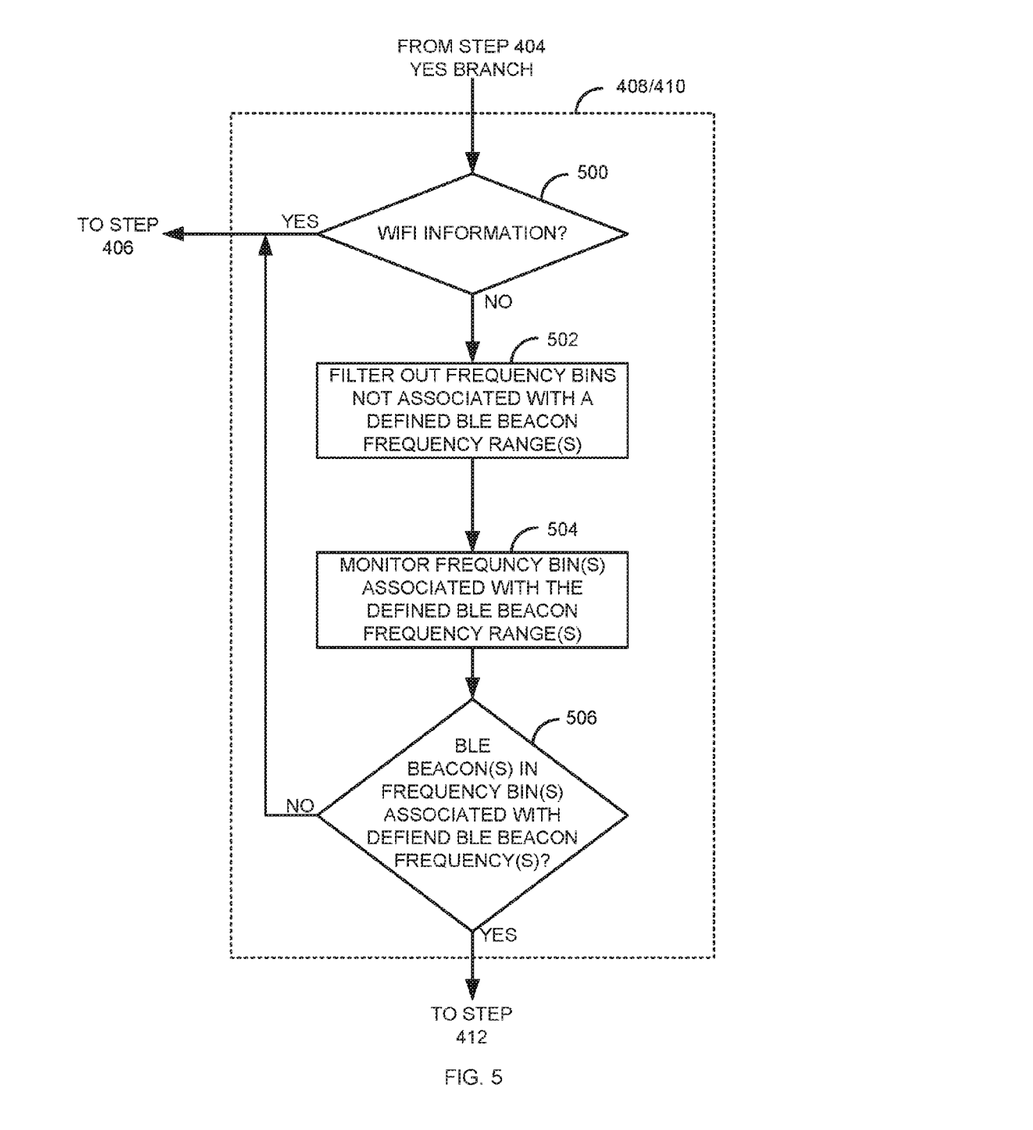
FIG. 5 is a flow diagram of a process for detecting BLE beacons using a defined frequency bin.

FIG. 4 is a flow diagram of a process for detecting BLE beacons 102 using WiFi. Illustratively, the Bluetooth device 101, the WiFi endpoint 103, the WiFi device 110, the WiFi interface 111, the signal processing module 112, the transmission module 113, the communication device 230, the network interface 231, the management module 232, and the display module 233 are stored-program-controlled entities, such as a computer or microprocessor, which performs the method of FIGS. 4-5 and the processes described herein by executing program instructions stored in a computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400. The signal processing module 112 initializes, in step 402, the WiFi interface 111 based on characteristics of a WiFi chip/BLE beacon 103 characteristics. For example, the signal processing module 112 may set the WiFi interface 111 to divide each WiFi channels 341-1, 341-5, and 341-14 into two or more frequency bins 340. In addition, the signal processing module 112 may set a dwell period for a time that will likely capture one or more BLE beacons 102 in one or more BLE beacon channels 342. This allows the WiFi interface 111 to capture the BLE beacon interval.

The WiFi interface 111 waits in step 404 to receive communication information. The communication information may be a BLE beacon 102 and/or may be WiFi information. If there is not any communication information in step 404, the process waits to see if there is a timeout in step 406. A timeout occurs when a BLE beacon 102 has not been received within a period of time. The timeout period may be set by an administrator. If there has not been a timeout in step 406, the process repeats step 404. Otherwise, the process goes to step 412 (described below).

If there is communication information in step 404, the signal processing module 112 filters the communication information based on a defined BLE beacon channel 342 in step 408. The signal processing module 112 determines in step 410 if the communication information is a BLE beacon 102. The BLE beacon 102 can be determined based on a defined threshold (e.g., a threshold over a noise level and/or a signal strength of the BLE beacon 102). If the communication information is not a BLE beacon 102, the process goes to step 406.

Otherwise, if the communication information is a BLE beacon 102 in step 410 or if there is a timeout in step 406, the transmission module 113 generates BLE information in step 412. The BLE information may be that there were not any BLE beacons 102 received in a period of time (the timeout of step 406). The BLE beacon information may be that one or more BLE beacons 102 was received at one, two, or three BLE beacon channels 342-37, 342-38, 3-42-39. The BLE information may identify a BLE interval based on detection of two or more BLE beacons 102 in the same BLE beacon channel 342 or in two or three consecutive BLE beacon channels 342. The BLE information may identify a location of the Bluetooth device 101 (e.g., where there are multiple WiFi devices 110A-110N) or to identify that the Bluetooth device 101 is no longer beaconing.

The transmission module 113 determines, in step 414, whether it is time to send the BLE information. The transmission module 113 may periodically send the BLE information. For example, the transmission module 113 may send the BLE information every 5 minutes. Alternatively, the transmission module 113 may send the BLE information automatically and not implement step 414. If it is not time to send the BLE information in step 414, the process goes to step 418. If it is time to send the BLE information in step 414, the transmission module 113 sends the BLE information, in step 416, to the communication device 230.

The process determines in step 418 if the process is complete. If the process is complete in step 418, the process ends in step 420. Otherwise, the process goes back to step 404 and waits to receive communication information. This allows the process to capture BLE information over time and then send the captured BLE information over time to the communication device 230.

To illustrate, consider the following example. Assume that the BLE beacon 102 is from a sensor 101. The WiFi interface 111 receives a BLE beacon 102 periodically in the BLE beacon channels 342-37 to 342-39 every 10.24 seconds. The BLE beaconing process happens in quick succession in the three BLE beacon channels—342-37, 342-38, and 342-39—in that order. The total time for sending the BLE beacons 102 in quick succession in the three BLE beacon channels 342-37, 342-38, and 342-39 is typically <1 millisecond. This does not allow simultaneous monitoring of all three BLE beacon channels 342-37, 342-38, and 342-39 with a single WiFi interface 111. The maximum channel width in the WiFi interface 111 is typically based on a 40 MHz frequency range. Since the BLE beacon channels 342-37, 342-38, and 342-39 are separated by more than 40 MHz (as described in FIG. 3), switching to a new 40 MHz or 20 MHz frequency range is necessary to capture the BLE beacons 102 in all of the BLE beacon channels 342-37, 342-38, and 342-39. Since switching to an new frequency range takes much longer than 1 millisecond, one BLE beacon channel 342 (or two at most) may monitored at one time. As each BLE beacon 102 is received in step 404, the BLE beacon 102 is filtered in step 408 and BLE information is generated in step 412. The transmission module 113 sends BLE information periodically in step 416 to the communication device 230. The network interface 231 receives the BLE information periodically. The management module 232 then manages the BLE information and the display module generates the BLE information graphically for a user to see. In this example, the communication device 230 will show the periodic BLE beacons 102 from the sensor 101 with a BLE beacon interval of 10.24 seconds.

FIG. 5 is a flow diagram of a process for detecting BLE beacons 102 using a defined frequency bin 304. FIG. 5 is an exemplary embodiment of steps 408 and 410 of FIG. 4. After receiving communication information in step 404, the signal processing module 112 determines, in step 500, if the communication information is WiFi information. For example, if the communication information is being sent to or received from the WiFi endpoint 103. When the communication information is being received from the WiFi endpoint 103 the signal processing module 112 halts monitoring the frequency bin 340 that is associated with the defined BLE beacon channel 342. For example, if WiFi communication information is being received on WiFi channel 341-1, then the signal processing module 112 will not be able to monitor the BLE beacon channel 342-37 (frequency bin 340A). The signal processing module 112 will have to wait until there is no more WiFi signals 104 being received/sent in WiFi channel 341-1 in order to a detect BLE beacons 102 in the BLE beacon channel 342-37 (frequency bin 340A).

If the communication information is WiFi information, in step 500, the process goes to step 406. Otherwise, if the communication information not WiFi information in step 500, the signal processing module 112 filters out frequency bins 340 not associated with a defined BLE beacon channel(s) 342 in step 502. The signal processing module 112 monitors, in step 504, the frequency bins 340 associated with the defined BLE beacon channel(s) 342. For example, the signal processing module 112 can monitor the frequency bins 304A, 340I, and 340S, which are associated with the BLE beacon channels 342-37, 342-38, and 342-39.

The signal processing module 112 determines, in step 506, if there are any BLE beacons 102 in the frequency bins 304 associated with the defined BLE beacon channels 342. If there are no BLE beacons 102 detected in the frequency bins 340 associated with the BLE beacon channel(s) 342 in step 506, the process goes to step 406. Otherwise, the process goes to step 412 where BLE information is generated.

All of the above processes may also work for multiple Bluetooth devices 101A-101N/WiFi devices 110A-110N as shown in FIG. 2. Each WiFi device 110A-110N can periodically collect BLE information and send the BLE information to the communication device 230 for display to a user.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to drawings. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

n yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A Wireless Fidelity ("WiFi") device comprising:
    a microprocessor;
    a WiFi interface; and
    a computer readable medium, coupled with the microprocessor and comprising microprocessor readable and executable instructions that cause the microprocessor to execute:
    a signal processing module that receives communication information from the WiFi interface, filters the communication information from the WiFi interface based on a defined Bluetooth Low Energy (BLE) beacon channel that is within a WiFi channel defined in the WiFi interface, detects if there are one or more BLE beacons in the defined BLE beacon channel, and generates BLE information in response to detecting if there are one or more BLE beacons in the defined BLE beacon channel; and
    a transmission module that sends the BLE information to a communication device.

2. The WiFi device of claim 1, wherein the WiFi interface is not designed to support Bluetooth.

3. The WiFi device of claim 1, wherein the signal processing module sets the WiFi interface to divide two WiFi channels into a plurality of frequency bins and monitors, at the same time, two frequency bins of the plurality of frequency bins that are associated with a respective defined BLE beacon channel.

4. The WiFi device of claim 1, wherein the signal processing module sets the WiFi interface to divide the defined WiFi channel into a plurality of frequency bins and monitors a frequency bin of the plurality of frequency bins that is associated with the defined BLE beacon channel.

5. The WiFi device of claim 4, wherein the signal processing module analyzes the frequency bin that is associated with the defined BLE beacon channel for a dwell period that is long enough to cover at least a plurality of BLE beacon intervals.

6. The WiFi device of claim 4, wherein the signal processing module halts monitoring the frequency bin that is associated with the defined BLE beacon channel based on reception of a WiFi signal at the WiFi interface.

7. The WiFi device of claim 4, wherein the signal processing module sets the WiFi interface to divide three WiFi channels into a respective plurality of frequency bins and a monitors a respective frequency bin in each the three WiFi channels that corresponds to a respective defined BLE beacon channel.

8. The WiFi device of claim 7, wherein each of the respective defined BLE beacon channels are monitored in a defined sequence.

9. The WiFi device of claim 1, wherein the BLE information is used to identify a location of a Bluetooth device or to identify that the Bluetooth device is no longer beaconing.

10. The WiFi device of claim 1, wherein the signal processing module determines a threshold for detecting if there are one or more BLE beacons in the defined BLE beacon channel, wherein the threshold is based on a signal strength of the one or more BLE beacons or a noise level.

11. A method comprising:
    receiving, by a microprocessor, communication information from a Wireless Fidelity ("WiFi") interface;
    filtering, by the microprocessor, the communication information from the WiFi interface based on a defined Bluetooth Low Energy (BLE) beacon channel that is within a WiFi channel defined in the WiFi interface;
    detecting, by the microprocessor, when there are one or more BLE beacons in the defined BLE beacon channel;
    in response to detecting that there are one or more BLE beacons in the defined BLE beacon channel, generating, by the microprocessor BLE information; and
    sending, by the microprocessor, the BLE information to a communication device.

12. The method of claim 11, wherein microprocessor sets the WiFi interface to divide two WiFi channels into a plurality of frequency bins and monitors, at the same time, two frequency bins of the plurality of frequency bins that are associated with a respective defined BLE beacon channel.

13. The method of claim 11, wherein the microprocessor sets the WiFi interface to divide the defined WiFi channel into a plurality of frequency bins and monitors a frequency bin of the plurality of frequency bins that is associated with the defined BLE beacon channel.

14. The method of claim 13, wherein the microprocessor halts monitoring the frequency bin that is associated with the defined BLE beacon channel based on reception of a WiFi signal at the WiFi interface.

15. The method of claim 13, wherein the microprocessor sets the WiFi interface to divide three WiFi channels into a respective plurality of frequency bins and monitors a respective frequency bin in each the three WiFi channels that corresponds to a respective defined BLE beacon channel.

16. The method of claim 15, wherein each of the respective defined BLE beacon channels are monitored in a defined sequence.

17. The method of claim 11, wherein the microprocessor determines a threshold for detecting if there are one or more BLE beacons in the defined BLE beacon channel, wherein the threshold is based on a signal strength of the one or more BLE beacons or a noise level.

18. The method of claim 11, wherein the BLE information is used to identify that a Bluetooth device is no longer functioning or is in a specific location.

19. A communication device comprising:
 a microprocessor;
 a network interface; and
 a computer readable medium, coupled with the microprocessor and comprising microprocessor readable and executable instructions that program the microprocessor to execute:
 a management module that receives Bluetooth Low Energy (BLE) information from a Wireless Fidelity ("WiFi") device via the network interface, wherein the BLE information is based on communication information received from the WiFi device that has been filtered based on a defined BLE beacon channel that is within a WiFi channel defined in a WiFi interface; and
 a display module that prepares the BLE information for display to a user.

20. The communication device of claim 19, wherein the received BLE information comprises BLE information received from a plurality of WiFi devices and wherein the display module displays prepares the BLE information received from the plurality of WiFi devices for display to the user.

* * * * *